United States Patent
Etchason et al.

(10) Patent No.: US 11,858,495 B2
(45) Date of Patent: *Jan. 2, 2024

(54) SYSTEM AND METHOD FOR CONTROLLING ENGINE STOP-START EVENTS

(71) Applicant: Allison Transmission, Inc., Indianapolis, IN (US)

(72) Inventors: Claire Etchason, Indianapolis, IN (US); Jacob Hoeschen, Indianapolis, IN (US); Charles F. Long, Zionsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,075

(22) Filed: Jul. 20, 2022

(65) Prior Publication Data

US 2022/0355782 A1 Nov. 10, 2022

Related U.S. Application Data

(63) Continuation of application No. 17/120,540, filed on Dec. 14, 2020, now Pat. No. 11,420,609.

(51) Int. Cl.
*B60W 10/30* (2006.01)
*B60W 10/06* (2006.01)
(Continued)

(52) U.S. Cl.
CPC ............ *B60W 10/06* (2013.01); *B60W 10/02* (2013.01); *B60W 10/10* (2013.01);
(Continued)

(58) Field of Classification Search
CPC ...... B60W 10/06; B60W 10/10; B60W 10/30; B60W 30/18018; B60W 30/18027; B60W 30/18118; B60W 2510/10; B60W 2520/16; B60W 2552/15; B60W 2710/06; B60W 2710/30; B60W 2710/10
(Continued)

(56) References Cited

U.S. PATENT DOCUMENTS 6,404,072 B2 6/2002 Onoyama et al.
6,709,362 B2 3/2004 Tomohiro et al.
(Continued)

FOREIGN PATENT DOCUMENTS

DE 10211466 C1 8/2003
DE 102018221482 A1 6/2020
(Continued)

OTHER PUBLICATIONS

Mueller, Norbert, et al., "Next Generation Engine Start/Stop Systems: Free-Wheeling," SAE International Journal of Engines 4.1 (2011): 874-887, https://booksc.xyz/book/71794440/ceffc8.
(Continued)

*Primary Examiner* — Roger L Pang
(74) *Attorney, Agent, or Firm* — Faegre Drinker Biddle & Reath LLP (57) ABSTRACT

Systems and methods are provided for controlling a transmission. An engine stop-start event may be allowed or denied based on one or more characteristics of the vehicle including the transmission.

19 Claims, 5 Drawing Sheets

(51) Int. Cl.
*B60W 10/02* (2006.01)
*B60W 10/103* (2012.01)
*B60W 10/10* (2012.01)
*B60W 30/18* (2012.01)

(52) U.S. Cl.
CPC .......... *B60W 10/103* (2013.01); *B60W 10/30* (2013.01); *B60W 30/18018* (2013.01); *B60W 30/18027* (2013.01); *B60W 30/18118* (2013.01); *B60W 2510/10* (2013.01); *B60W 2520/16* (2013.01); *B60W 2552/15* (2020.02); *B60W 2710/06* (2013.01); *B60W 2710/10* (2013.01); *B60W 2710/30* (2013.01)

(58) Field of Classification Search
USPC .......................................................... 701/54
See application file for complete search history.

(56) References Cited

U.S. PATENT DOCUMENTS

| | | | |
|---|---|---|---|
| 6,913,558 B2 | 7/2005 | Mori et al. | |
| 7,041,030 B2 | 5/2006 | Kuroda et al. | |
| 7,465,250 B2 | 12/2008 | Tamai et al. | |
| 8,032,295 B2 | 10/2011 | Hernier et al. | |
| 8,057,355 B2 * | 11/2011 | Tryon | F16H 61/0031 |
| | | | 180/65.275 |
| 8,062,171 B2 | 11/2011 | Soliman | |
| 8,543,318 B2 | 9/2013 | Ma et al. | |
| 8,565,990 B2 | 10/2013 | Ortmann et al. | |
| 8,652,002 B2 | 2/2014 | Otanez et al. | |
| 8,702,562 B2 | 4/2014 | Zhang et al. | |
| 8,712,673 B2 | 4/2014 | Gwon et al. | |
| 8,784,266 B2 | 7/2014 | Christen et al. | |
| 8,840,524 B2 | 9/2014 | Arsenault et al. | |
| 8,892,323 B2 | 11/2014 | Wakayama et al. | |
| 9,026,323 B2 | 5/2015 | Lin et al. | |
| 9,163,722 B2 | 10/2015 | Yamada et al. | |
| 9,316,198 B2 | 4/2016 | Gibson et al. | |
| 9,381,910 B2 | 7/2016 | Sakata | |
| 9,399,454 B2 | 7/2016 | Somerville et al. | |
| 9,457,811 B2 | 10/2016 | Yu et al. | |
| 9,555,792 B2 | 1/2017 | Gibson et al. | |
| 9,651,144 B2 | 5/2017 | Long et al. | |
| 9,810,168 B2 | 11/2017 | Kato et al. | |
| 9,995,385 B2 | 6/2018 | Rogner et al. | |
| 10,005,461 B2 | 6/2018 | Yu et al. | |
| 10,112,612 B2 | 10/2018 | Siddiqui et al. | |
| 10,215,241 B2 | 2/2019 | Khafagy et al. | |
| 10,358,124 B2 | 7/2019 | Kim | |
| 10,597,024 B2 | 3/2020 | Khafagy et al. | |
| 10,787,161 B2 * | 9/2020 | Akiyoshi | B60W 10/182 |
| 11,420,609 B2 * | 8/2022 | Etchason | B60W 10/30 |
| 2008/0188351 A1 | 8/2008 | Schiele et al. | |
| 2011/0077830 A1 | 3/2011 | Lochocki, Jr. et al. | |
| 2012/0310489 A1 | 12/2012 | Hague et al. | |
| 2015/0142286 A1 | 5/2015 | Waku et al. | |
| 2015/0337953 A1 * | 11/2015 | Kasuya | F16H 63/34 |
| | | | 192/219.5 |
| 2018/0073628 A1 | 3/2018 | Mouri et al. | |
| 2019/0331216 A1 * | 10/2019 | Dong | F16H 61/0025 |
| 2022/0185260 A1 | 6/2022 | Etchason et al. | |

FOREIGN PATENT DOCUMENTS

| | | | |
|---|---|---|---|
| JP | 2016031144 A | 3/2016 | |
| KR | 20110028888 A | 3/2011 | |
| WO | 2006046351 A1 | 5/2006 | |
| WO | 2017051733 A1 | 3/2017 | |
| WO | WO-2018123225 A1 * | 7/2018 | ............. B60K 6/543 |

OTHER PUBLICATIONS

Van Oorschot, Paul F., et al., "Realization and control of the Lupo EL electric vehicle," World Electric Vehicle Journal 5.1 (2012): 14-23, https://www.mdpi.com/2032-6653/5/1/14/pdf.

Frame, Edwin A., et al., "M1078 Hybrid Hydraulic Vehicle Fuel Economy Evaluation," (2012), https://apps.dtic.mil/sti/pdfs/ADA579702.pdf.

European Patent Office; Invitation to Pay Additional Fees; International Application No. PCT/US2021/063119; dated Mar. 3, 2022.

* cited by examiner

SYSTEM AND METHOD FOR CONTROLLING ENGINE STOP-START EVENTS

RELATED APPLICATIONS

This application is a continuation of U.S. application Ser. No. 17/120,540, filed Dec. 14, 2020, titled SYSTEM AND METHOD FOR CONTROLLING ENGINE STOP-START EVENTS, the entire disclosure of which is expressly incorporated by reference herein.

TECHNICAL FIELD OF THE DISCLOSURE

The present disclosure relates to a system and method for controlling engine stop-start events, and more particularly to a system and method for controlling engine stop-start events based on vehicle grade and/or a required pump pressure and system leakage.

BACKGROUND OF THE DISCLOSURE

In various powertrains, a transmission includes a main pump and an auxiliary pump, where the auxiliary pump is used to provide flow and pressurize clutches during engine stop-start (ES-S) events. Auxiliary pumps are sometimes commanded to run at a given speed determined by temperature alone. This results in the auxiliary pump utilizing more power than necessary at times creating excessive battery draw and requiring a regulator valve, all resulting in a less efficient system.

SUMMARY OF THE DISCLOSURE

In an exemplary embodiment of the present disclosure, a transmission of a powertrain of a vehicle is provided. The powertrain including an engine and an engine stop start arbitration controller. The transmission comprising: a gear and selective coupler arrangement; a main hydraulic pump operatively coupled to the gear and selective coupler arrangement; an auxiliary pump operatively coupled to the gear and selective coupler arrangement; and a transmission control circuit operatively coupled to the main pump and the auxiliary pump. The transmission control circuit configured to: determine a first grade of the vehicle at a first location; determine a first auxiliary pump speed for an engine stop-start event based on the determined first grade of the vehicle at the first location; determine a second grade of the vehicle at the first location; and determine a second auxiliary pump speed for the engine stop-start event based on the determined second grade of the vehicle at the first location.

In an example thereof, the transmission control circuit operates the main hydraulic pump during a first operation of the vehicle and operates the auxiliary pump during a second operation of the vehicle. In a variation thereof, the first operation of the vehicle corresponds to the vehicle moving from the first location to a second location and the second operation of the vehicle is while the vehicle remains at the first location. In another variation thereof, the second operation is an engine stop-start event.

In another example thereof, the transmission control circuit based on the determined auxiliary first pump speed being above a threshold allowable speed is further configured to communicate an engine stop-start deny communication to the engine stop start arbitration controller.

In a further example thereof, the transmission control circuit is further configured to add a grade settling error to the determined first grade of the vehicle before determining the first auxiliary pump speed.

In another exemplary embodiment of the present disclosure, a method of controlling a transmission during an engine stop-start event of an engine of a powertrain of a vehicle is provided. The method comprising: determining a first grade of the vehicle at a first location; determining a first auxiliary pump speed of an auxiliary pump of the transmission for an engine stop-start event based on the determined first grade of the vehicle at the first location; determining a second grade of the vehicle at the first location; and determining a second auxiliary pump speed of the auxiliary pump of the transmission for the engine stop-start event based on the determined second grade of the vehicle at the first location.

In an example thereof, the steps of determining a first grade of the vehicle at the first location and determining a second grade of the vehicle at the first location are performed by a transmission control circuit of the transmission.

In another example thereof, the method further comprising the steps of: while the vehicle is at the first location holding a gear and selective coupler arrangement in a first configuration with the auxiliary pump of the transmission; and subsequently while the vehicle is traveling configuring the gear and selective coupler arrangement with a main pump of the transmission.

In a further example thereof, the method further comprising the steps of: determining the determined auxiliary first pump speed exceeds a threshold allowable speed; and communicating an engine stop-start deny communication to an engine stop start arbitration controller of the vehicle.

In a further exemplary embodiment of the present disclosure, a transmission of a powertrain of a vehicle is provided. The powertrain including an engine and an engine stop start arbitration controller. The transmission comprising: a gear and selective coupler arrangement; a main hydraulic pump operatively coupled to the gear and selective coupler arrangement; an auxiliary pump operatively coupled to the gear and selective coupler arrangement; and a transmission control circuit operatively coupled to the main pump and the auxiliary pump. The transmission control circuit configured to: determine a system leakage of the transmission; determine a required pump speed for the auxiliary pump of the transmission for the engine stop-start event based on the system leakage; compare the determined auxiliary required pump speed to a threshold allowable speed; and communicate an engine stop-start allow communication to the engine stop start arbitration controller if the determined auxiliary required pump speed satisfies the threshold allowable speed.

In an example thereof, the transmission control circuit is further configured to communicate an engine stop-start deny communication to the engine stop start arbitration controller if the determined auxiliary required pump speed exceeds the threshold allowable speed.

In another example thereof, the transmission control circuit is further configured to: determine a first grade of the vehicle at a first location; and the required pump speed for the auxiliary pump of the transmission for the engine stop-start event is further based on the first grade of the vehicle at the first location. In a variation thereof, the transmission control circuit is further configured to: determine a second grade of the vehicle at the first location; and update the required pump speed for the auxiliary pump of the transmission for the engine stop-start event based on the second grade of the vehicle at the first location.

In a further example thereof, the transmission control circuit operates the main hydraulic pump during a first operation of the vehicle and operates the auxiliary pump during a second operation of the vehicle. In a variation thereof, the first operation of the vehicle corresponds to the vehicle moving from the first location to a second location and the second operation of the vehicle is while the vehicle remains at the first location. In a further variation thereof, the second operation is the engine stop-start event.

In yet another exemplary embodiment of the present disclosure, a method of controlling a transmission during an engine stop-start event of an engine of a powertrain of a vehicle is provided. The method comprising: determining a system leakage of the transmission; determining a required pump speed for an auxiliary pump of the transmission for the engine stop-start event based on the system leakage; determining the determined auxiliary required pump speed satisfies a threshold allowable speed; and communicating an engine stop-start allow communication to an engine stop start arbitration controller.

In an example thereof, the method further comprising the steps of: determining a first grade of the vehicle at a first location; and wherein the step of determining the required pump speed for the auxiliary pump of the transmission for the engine stop-start event is further based on the first grade of the vehicle at the first location. In a variation thereof, the method further comprising the steps of: determining a second grade of the vehicle at the first location; and updating the required pump speed for the auxiliary pump of the transmission for the engine stop-start event based on the second grade of the vehicle at the first location.

Advantages and features of the embodiments of this disclosure will become more apparent from the following detailed description of exemplary embodiments when viewed in conjunction with the accompanying drawings.

BRIEF DESCRIPTION OF THE DRAWINGS

Corresponding reference characters indicate corresponding parts throughout the several views. The exemplification set out herein illustrates an exemplary embodiment of the disclosure and such exemplification is not to be construed as limiting the scope of the disclosure in any manner.

DETAILED DESCRIPTION OF THE DRAWINGS

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

Figure 1:
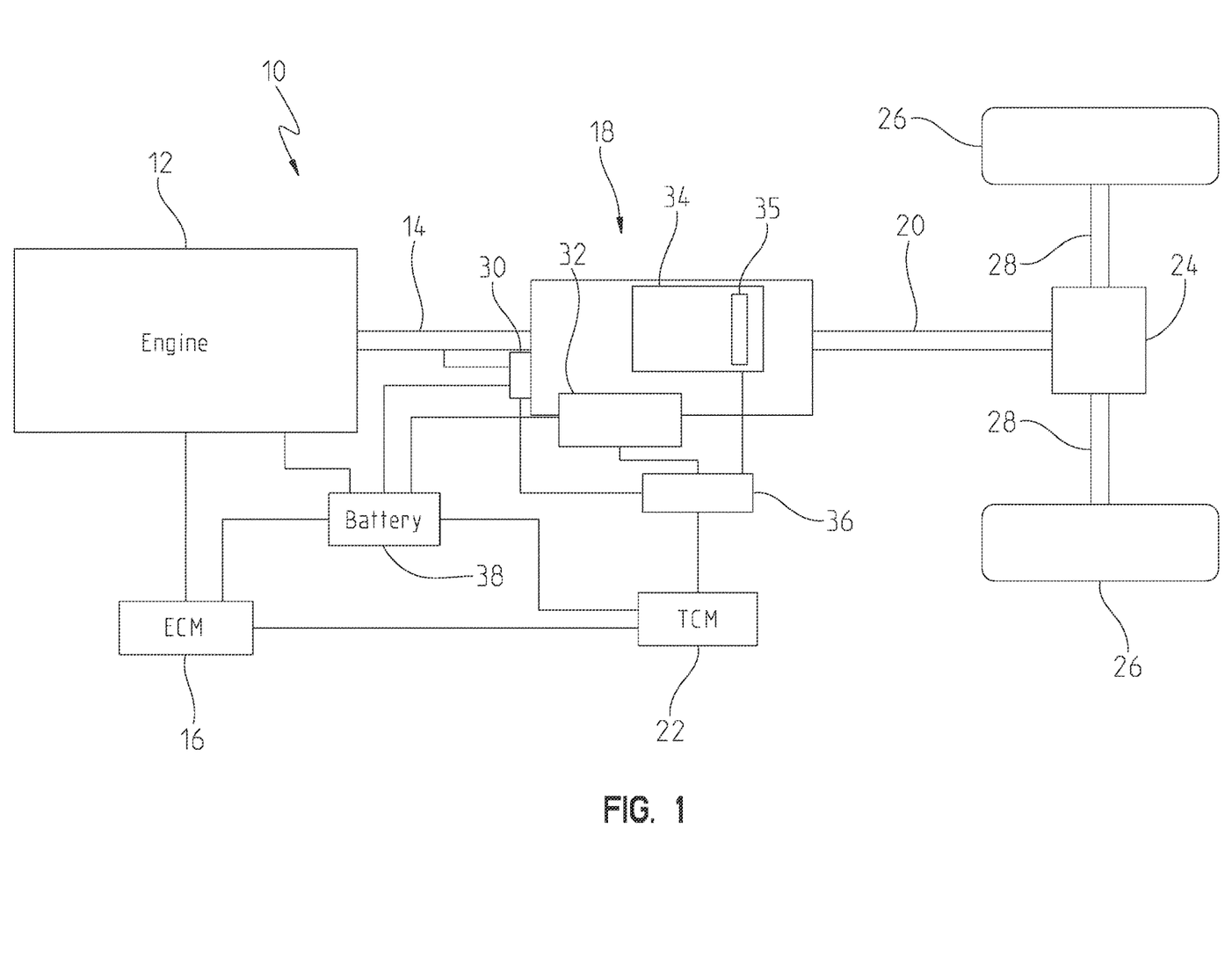
FIG. 1 shows a block diagram and schematic view of one illustrative embodiment of a powered vehicle having a transmission.

Referring to FIG. 1, a schematic view of a vehicle 10 of the present disclosure is shown. Vehicle 10 generally includes an engine 12 having a crankshaft 14, an engine control module (ECM) 16 operatively coupled to engine 12 and configured to control engine 12, a transmission 18 operatively coupled to engine 12 through crankshaft 14, a transmission control module (TCM) 22 operatively coupled to transmission 18 and ECM 16, a final drive/differential assembly 24 operatively coupled to transmission 18 through a prop shaft 20 coupled to a transmission output (not shown), and wheels 26, where wheels 26 are operatively coupled to final drive 24 through axle shafts 28. While a rear-wheel drive powertrain has been illustrated, it should be appreciated that vehicle 10 may have a front-wheel drive powertrain without departing from the scope of the present disclosure.

In various embodiments, transmission 18 further includes a transmission input shaft (not shown) coupled to crankshaft 14 of engine 12, a main pump 30, an auxiliary pump 32, a gear and selective coupler arrangement 34, and a hydraulic system 36. Gear and selective coupler arrangement 34 includes at least one selective coupler, such as clutches and/or brakes, and at least one gear, and illustratively includes a clutch 35. As is known, exemplary gear and selective coupler arrangements generally include a plurality of selective couplers and gears which may be configured to provide a plurality of different speed ratios of the transmission output shaft to the transmission input shaft. Additional details regarding an exemplary transmission are provided in U.S. Pat. No. 9,651,144, assigned to the present assignee, the entire disclosure of which is expressly incorporated by reference herein.

A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in US Published Patent Application No. 2016/0047440, the entire disclosure of which is expressly incorporated by reference herein. Exemplary gear and selective coupler arrangements 34 are provided in exemplary multi-speed automatic transmissions, such as automatic transmissions and automated manual transmissions. Exemplary gear and selective coupler arrangements 34 are disclosed in U.S. Pat. No. 10,808,807, the entire disclosure of which is expressly incorporated by reference herein.

Main pump 30 is operatively coupled to crankshaft 14 via a gear set or other coupler arrangement (not shown) such that main pump 30 is rotated by crankshaft 14, and gear and selective coupler arrangement 34 is operatively coupled between the transmission input shaft and the transmission output shaft. Hydraulic system 36 includes main pump 30, auxiliary pump 32, and various hydraulic circuits and valves. Hydraulic system 36 is operatively coupled to TCM 22 and gear and selective coupler arrangement 34 to actuate various clutches and/or brakes of gear and selective coupler arrangement 34, such as clutch 35. TCM 22 is a transmission control circuit. Exemplary transmission control circuits may be microprocessor-based and include a non-transitory computer readable medium 202 which includes processing instructions stored therein that are executable by the microprocessor to control operation of the main pump 30, the auxiliary pump 32, and the gear and selective coupler arrangement 34. A non-transitory computer-readable medium, or memory, may include random access memory (RAM), read-only memory (ROM), erasable programmable read-only memory (e.g., EPROM, EEPROM, or Flash memory), or any other tangible medium capable of storing information. Exemplary logic flows are disclosed herein which correspond to processing sequences executed by TCM 22.

In operation, main pump 30 is controlled by TCM 22 to control the configuration of gear and selective coupler arrangement 34 while vehicle 10 is moving from a first location to a second location. Auxiliary pump 32 is controlled by TCM 22 to control the configuration of gear and selective coupler arrangement 34 while vehicle 10 is stationary at the first location. Main pump 30 is operatively powered by its coupling to crankshaft 14 while auxiliary pump 32 is powered by a battery 38 of vehicle 10.

Figure 2:
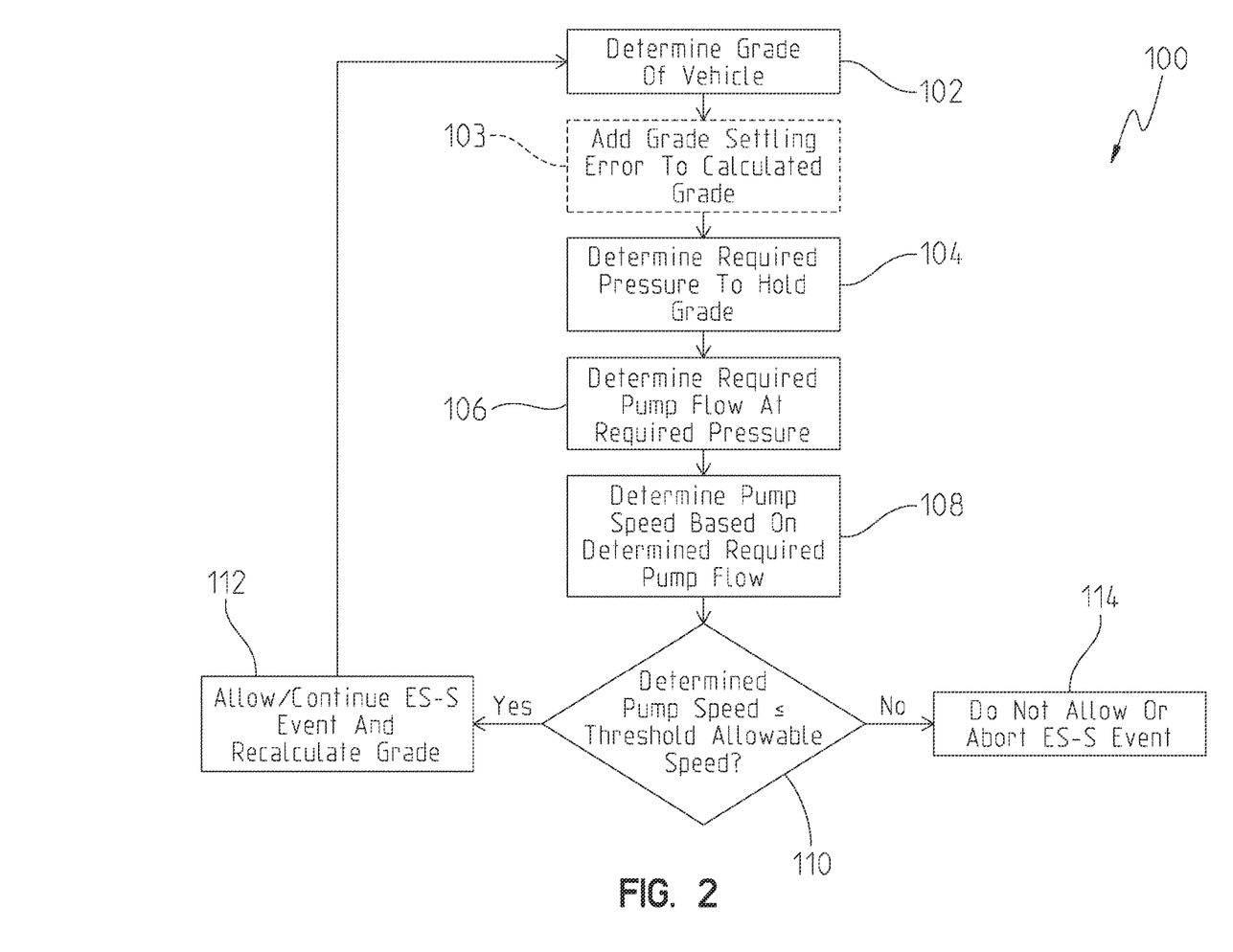
FIG. 2 shows an exemplary logic flow diagram of a control system of the transmission for determining whether to allow an engine stop-start event based on vehicle grade.

With reference to FIG. 2, and with continued reference to FIG. 1, a processing sequence 100 of TCM 22 for controlling transmission 18 for engine stop-start events will now be described. Processing sequence 100 controls transmission 18 for engine stop-start events based on a grade of vehicle 10 where auxiliary pump 32 is run at a calculated pump speed if sufficient pressure can be provided to gear and selective coupler arrangement 34 from auxiliary pump 32 for providing hill hold for vehicle 10 while stopped on the grade.

Processing sequence 100 of TCM 22 determines a grade of vehicle 10, as represented by block 102. Additional details regarding the measurement of road grade are provided in US Published Patent Application No. 2014/0336890, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein. In other embodiments, TCM 22 receives an indication of vehicle grade based on a GPS location of vehicle 10. In other embodiments, TCM 22 receives an indication of vehicle grade from another system of vehicle 10.

Processing sequence 100 determines a required pressure needed for auxiliary pump 32 to allow gear and selective coupler arrangement 34 to provide hill hold for vehicle 10 while stopped on the determined vehicle grade, as represented by block 104. Using the determined required pressure, processing sequence 100 continues to determine a pump flow at the required pressure, as represented by block 106. A pump speed is determined from the pump flow, as represented by block 108. The determined pump speed of auxiliary pump 32 is compared to a threshold allowable speed of auxiliary pump 32, as represented by block 110. In embodiments, the threshold allowable speed is the maximum allowable speed of the auxiliary pump. In embodiments, the threshold allowable speed is less than the maximum allowable speed of the auxiliary pump.

If the determined pump speed is greater than the threshold allowable speed of auxiliary pump 32, then the engine stop-start event is not attainable and TCM 22 communicates with an engine stop-start (ES-S) arbitration controller, illustratively ECM 16, to not allow the engine stop-start event to occur or to abort the engine stop-start event, as represented by block 114. In embodiments, the ES-S arbitration controller is not ECM 16, but rather a separate device which communicates with both ECM 16 and TCM 22. If the determined pump speed is less than or equal to the threshold allowable speed of auxiliary pump 32, then the engine stop-start event is attainable and processing sequence 100 continues with TCM 22 communicating with the ES-S arbitration controller, illustratively ECM 16, to allow the engine stop-start event to occur, as represented by block 112. Processing sequence 100 returns to block 102 and again determines the grade of vehicle 10 and subsequently determining a new pump speed based on the recalculated grade through steps 104-110. The reason for the redetermination of the vehicle road grade is that the road grade determined by TCM 22 improves over time. Thus, the second and subsequent determinations of the vehicle road grade may result in a road grade value that requires a lower pump speed and thereby reduces the energy consumed by auxiliary pump 32.

After vehicle 10 comes to a stop, the determined vehicle grade may take some time to settle. To avoid engine shutdown delay and prevent change-of-mind restarts, processing sequence 100 may further include block 103 where a grade settling error may be added to the determined vehicle grade prior to determining the required pump speed. The magnitude of the grade settling error, and subsequently the resulting determined pump speed, may be reduced over time during a given stop event as vehicle grade confidence increases. The increased vehicle grade confidence and settled determined grade, and subsequently the improved determined pump speed, are incorporated into processing sequence 100 by the repeating of blocks 102-110 discussed above.

Figure 3:
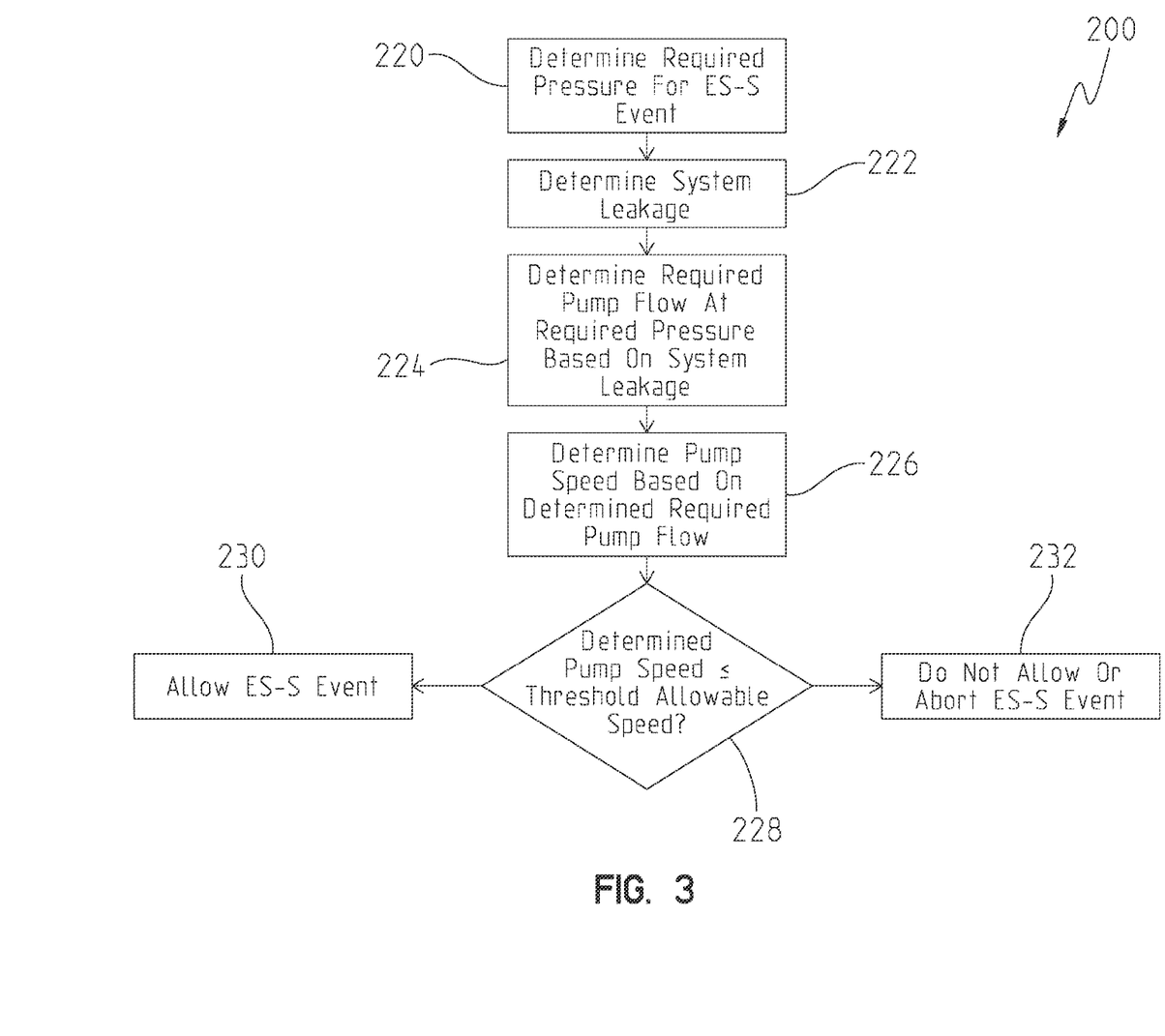
FIG. 3 shows an exemplary logic flow diagram of a control system of the transmission for determining whether to allow an engine stop-start event based on a required pressure and system leakage.
Figure 4:
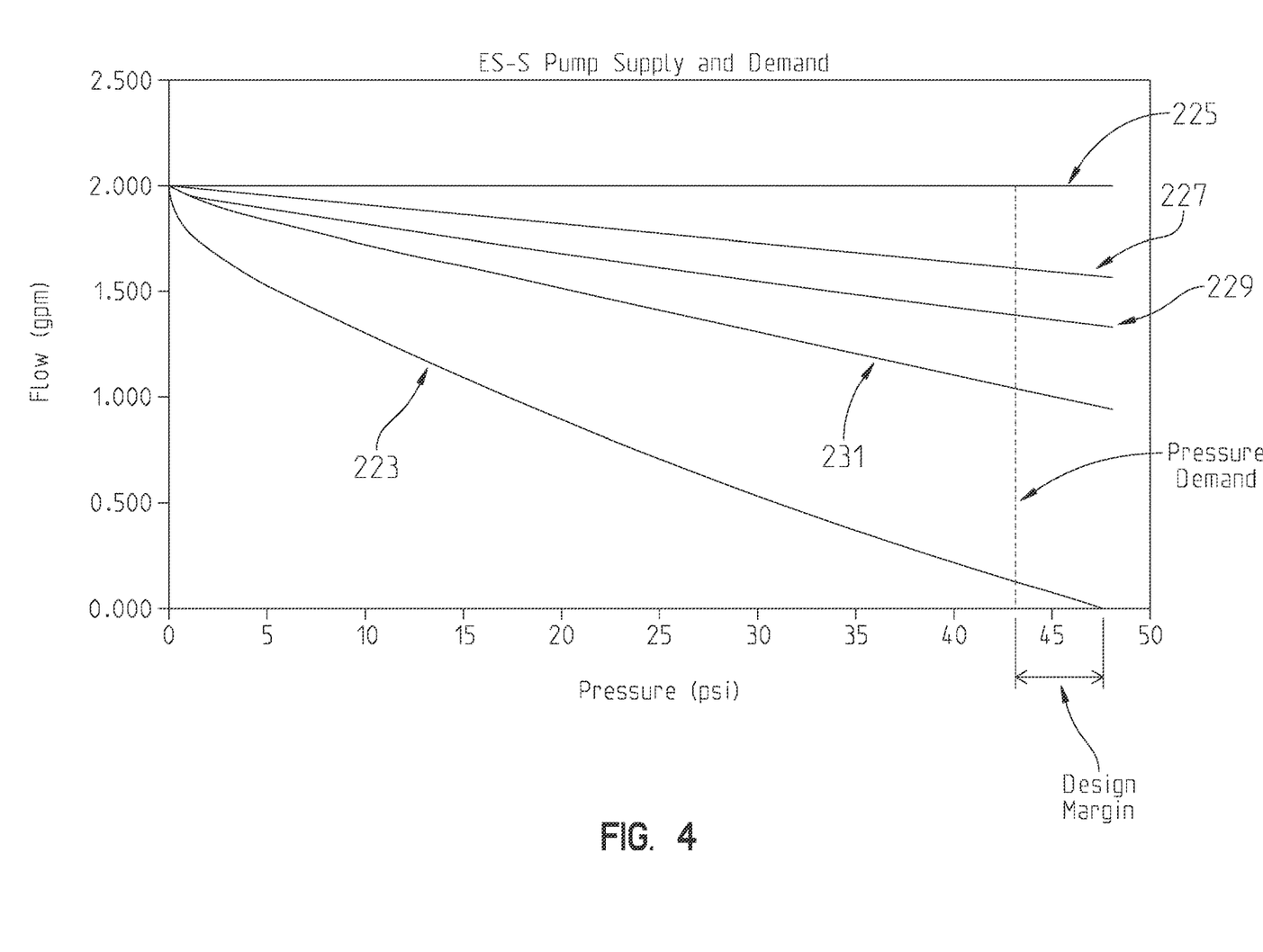
FIG. 4 shows a graphical representation of leakage of a pump of the powered vehicle of FIG. 1 based on pressure.

With reference to FIGS. 3 and 4, and with continued reference to FIG. 1, another processing sequence 200 for controlling transmission 18 for engine stop-start events will now be described. Processing sequence 200 is configured to control transmission 18 for engine stop-start events by operating auxiliary pump 32 being operated at a determined pump speed based at least on a required pressure and system leakage if the engine stop-start event is determined to be attainable.

Processing sequence 200 determines a required pressure for a specific engine stop-start event, which may include adjustments to incorporate possible measurement variations and/or errors, as represented by block 220. The required pressure may depend on gross vehicle weight (GVM), vehicle grade, a ratio of engine rotational speed to vehicle speed (N/V), clutch coefficients, clutch return spring characteristics, logic valve spring pressure, and/or other clutch specifications. In various embodiments, the required pressure may be the pressure needed for gear and selective coupler arrangement 34 to provide vehicle hill hold while vehicle 10 is on a grade or the pressure needed for gear and selective coupler arrangement 34 to maintain logic valve/clutch return spring states.

Processing sequence 200 continues by determining an overall system, transmission 18, leakage at the required pressure using known hydraulic leakage parameters, as represented by block 222. These known parameters may include temperature, clutch bleeds, pump leakages, controls leakages, and/or other known parameters. In various embodiments, the overall system leakage may be determined by a look-up table, while in other various embodiments, the overall system leakage may be determined via an algorithm.

An exemplary curve 223 which may be used to generate a series of values for a look-up table is shown in FIG. 4. Curve 223 provides a pump flow corrected for leakage. The flow is in gallons per minute (gpm) at various pressures provided in pounds per square inch (psi). Curve 223 is determined by subtracting from a no leakage curve 225, the value of curves 227, 229, and 231. Curve 227 represents a constant leakage design value of gear and selective coupler arrangement 34 that increase linearly with pressure. Curve 229 represents the leakage due to the valve bodies of gear and selective coupler arrangement 34. Curve 231 represents additional leakage contributions of gear and selective coupler arrangement 34 such as pump leakages, controls leakage, clutch bleeds, and temperature effects. The overall system leakage may also or alternatively include adjustments to incorporate possible measurement variations and/or errors, which may also be known as design margins.

Processing sequence 200 uses the overall system leakage to determine a pump flow at the required pressure, as represented by block 224. A pump speed is determined based on the determined pump flow, as represented by block 226. In embodiments, the pump speed is determined by using a lookup table of pump speed for various pump flows. The determined pump speed for auxiliary pump 32 is compared to a threshold allowable speed of auxiliary pump 32, as represented by block 228. If the determined pump speed is less than or equal to the threshold allowable speed of auxiliary pump 32, then TCM 22 communicates with the ES-S arbitration controller, illustratively ECM 16, to allow the engine stop-start event to occur, as represented by block 230. If the determined pump speed is more than the threshold allowable speed of auxiliary pump 32, TCM 22 communicates with the ES-S arbitration controller, illustratively ECM 16, to not allow the engine stop-start event to occur, as represented by block 232.

Figure 5:
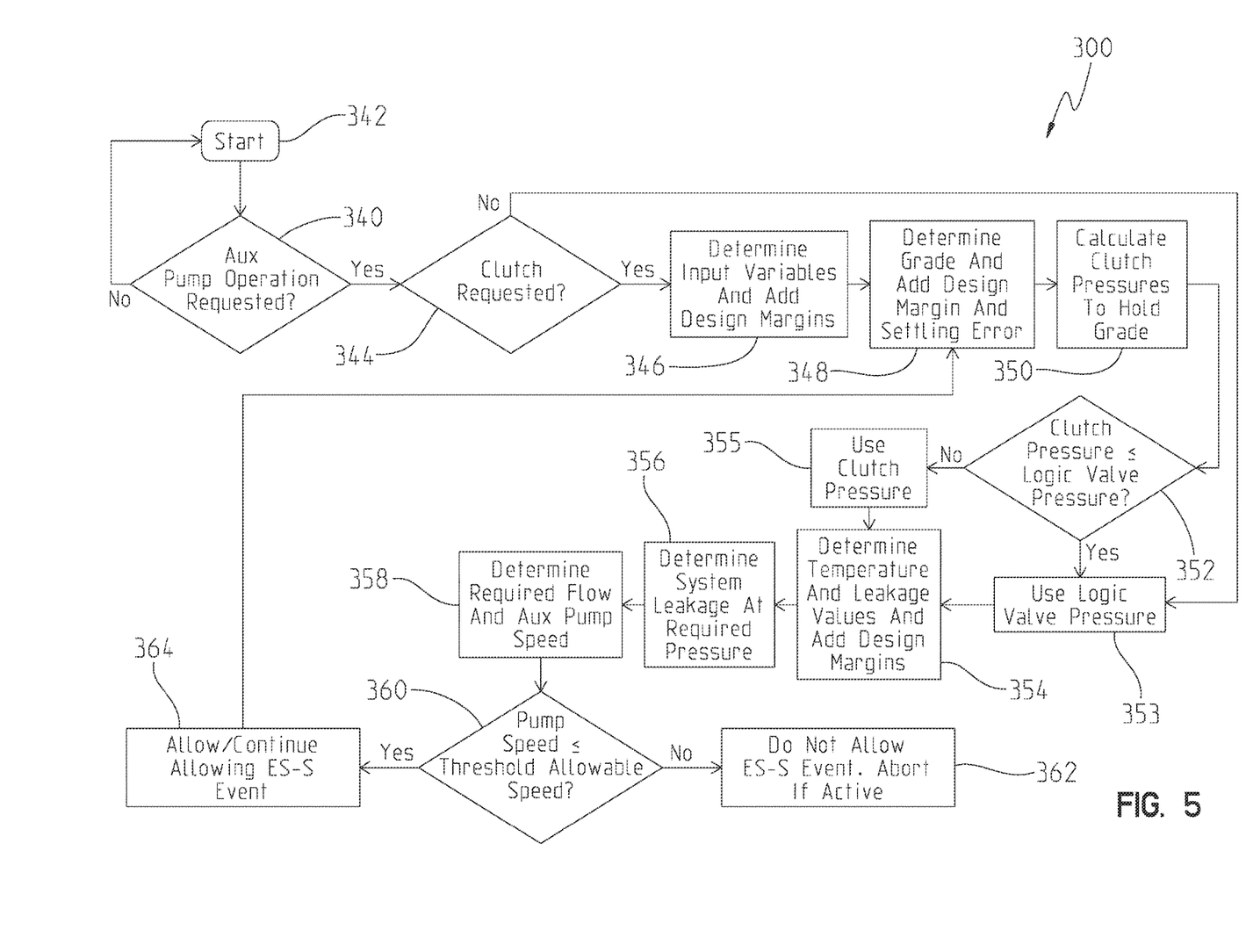
FIG. 5 shows an exemplary logic flow diagram of a control system of the transmission for determining whether to allow an engine stop-start event based on a required pressure and system leakage and/or vehicle grade.

Referring now to FIG. 5, and with continued reference to FIG. 1, yet another processing sequence 300 for controlling transmission 18 for engine stop-start events will now be described. Processing sequence 300 is an expansion on processing sequences 100 and 200 and is configured to control transmission 18 for engine stop-start events with auxiliary pump 32 being operated at a pump speed determined based on pressure and system leakage or both pressure and system leakage and the grade of vehicle 10 if the engine stop-start event is determined to be attainable.

In processing sequence 300, TCM 22 determines if operation of auxiliary pump 32 has been requested from the ES-S arbitration controller, illustratively ECM 16, as represented by block 340. A request to operate the auxiliary pump may be a request for an engine stop-start event. TCM 22 then determines if operation, an actuation, of a selective coupler, such as clutch 35, within gear and selective coupler arrangement 34 has been requested, as represented by block 344. A request to actuate clutch 35 may be a request for holding vehicle 10 stationary on a grade.

If operation of clutch 35 is not requested, processing sequence 300 continues at block 353 and using the logic valve pressure of gear and selective coupler arrangement 34 as described in further detail below. The logic valve pressure is the pressure needed to maintain the current state of the gear and selective coupler arrangement 34. If operation of clutch 35 is requested, processing sequence 300 continues with block 346 and determines various input variables which may include adjustments to incorporate possible measurement variations and/or errors, or design margins. Exemplary input variables may include gross vehicle weight (GVM), grade, a ratio of engine rotational speed to vehicle speed (N/V), clutch coefficients, clutch return springs, logic valve spring pressure, and/or other clutch specifications. Processing sequence 300 further includes block 348 in which a grade of vehicle 10 is determined by TCM 22. Blocks 346 and 348 may occur simultaneously, or one before or after the other.

With input variables and grade of vehicle 10 determined, processing sequence 300 continues at step 350 determining selective coupler pressures, such as clutch pressures, needed to hold the determined vehicle grade. The determined clutch pressure is compared to the logic valve pressure of gear and selective coupler arrangement 34, as represented by block 352. If the determined clutch pressure is less than or equal to the logic valve pressure, then the logic value pressure is used, as represented by block 353. If the determined clutch pressure is greater than the logic valve pressure, then the determined clutch pressure is used, as represented by block 355. Block 353 or block 355 represent the clutch pressure to be further evaluated.

The temperature and leakage values are determined, for the clutch pressure to be further evaluated, as represented by block 354. The temperature and leakage values determined at step 354 may include adjustments to incorporate possible measurement variations and/or errors, or design margins. The determined temperature and leakage values are then used to determine an overall system leakage at the clutch pressure to be further evaluated, as represented by block 356. A pump flow is determined based on the overall system leakage, as represented by block 358. Further, a pump speed for auxiliary pump 32 is determined based on the determined pump flow.

The determined pump speed is then compared to a threshold allowable speed of auxiliary pump 32, as represented by block 360. If the determined pump speed is greater than the maximum allowable speed of auxiliary pump 32, TCM 22 communicates with the ES-S arbitration controller, illustratively ECM 16, to not allow or abort the engine stop-start event, as represented by block 362. If the determined pump speed is less than or equal to the threshold allowable speed of auxiliary pump 32, TCM 22 communicates with the ES-S arbitration controller, illustratively ECM 16 to allow or continue the engine stop-start event with auxiliary pump 32 operating at the determined pump speed, as represented by block 364. If the engine stop-start event is allowed or continued, then processing sequence 300 continues by redetermining the grade of vehicle 10 at block 348 and running through the remainder of processing sequence 300 again to determine if the engine stop-start event should continue or be aborted based on a redetermined pump speed, where auxiliary pump 32 would operate at the redetermined pump speed if it is determined that engine stop-start event should be continue.

An advantage, among others, of determining a speed for auxiliary pump 32 for each specific engine stop-start event allows for a more efficient operation of vehicle 10 by supplying an appropriate amount of flow and avoiding excess pump speed. This in turn reduces battery draw, pump stress, and manufacturing costs due to the elimination of a regulator valve and reduced filter area requirement, which results in increased utilization and a longer life for auxiliary pump 32.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission of a powertrain of a vehicle, the powertrain including an engine and an engine stop-start arbitration controller, the transmission comprising:
   a gear and selective coupler arrangement;
   a main hydraulic pump operatively coupled to the gear and selective coupler arrangement;
   an auxiliary pump operatively coupled to the gear and selective coupler arrangement; and
   a transmission control circuit operatively coupled to the main pump and the auxiliary pump, the transmission control circuit configured to:
      determine one or more grades of the vehicle at a first location;
      determine one or more auxiliary pump speeds of an auxiliary pump of the transmission for an engine stop-start event based on the determined one or more grades of the vehicle at the first location;
      determine that one or more of the determined one or more auxiliary pump speeds exceed a threshold allowable speed; and
      based on the one of the one or more determined auxiliary pump speeds exceeding the threshold allowable speed, communicate an engine stop-start deny communication to an engine stop-start arbitration controller of the vehicle.

2. The transmission of claim 1, wherein the determining one or more grades of the vehicle at a first location comprises:
   determining a first grade of the vehicle at the first location; and
   determining a second grade of the vehicle at the first location.

3. The transmission of claim 2, wherein the determining one or more auxiliary pump speeds of an auxiliary pump of the transmission for an engine stop-start event based on the determined one or more grades of the vehicle at the first location comprises:
   determining a first auxiliary pump speed for an engine stop-start event based on the determined first grade of the vehicle at the first location; and
   determining a second auxiliary pump speed for the engine stop-start event based on the determined second grade of the vehicle at the first location.

4. The transmission of claim 3, wherein the transmission control circuit is further configured to add a grade settling error to the determined first grade of the vehicle before determining the first auxiliary pump speed.

5. The transmission of claim 1, wherein the transmission control circuit operates the main hydraulic pump during a first operation of the vehicle and operates the auxiliary pump during a second operation of the vehicle.

6. The transmission of claim 5, wherein the first operation of the vehicle corresponds to the vehicle moving from the first location to a second location and the second operation of the vehicle is while the vehicle remains at the first location.

7. The transmission of claim 5, wherein the second operation is an engine stop-start event.

8. The transmission of claim 1, wherein the transmission control circuit, based on one or more of the determined one or more auxiliary pump speeds being above a threshold allowable speed, is further configured to communicate an engine stop-start deny communication to the engine stop-start arbitration controller.

9. A method of controlling a transmission during an engine stop-start event of an engine of a powertrain of a vehicle, the method comprising:
   determining one or more grades of the vehicle at a first location;
   determining one or more auxiliary pump speeds of an auxiliary pump of the transmission for an engine stop-start event based on the determined one or more grades of the vehicle at the first location;
   determining one or more of the determined one or more auxiliary pump speeds exceed a threshold allowable speed; and
   based on the one of the one or more determined auxiliary pump speeds exceeding the threshold allowable speed, communicating an engine stop-start deny communication to an engine stop-start arbitration controller of the vehicle.

10. The method of claim 9, wherein the determining one or more grades of the vehicle at a first location comprises:
    determining a first grade of the vehicle at the first location; and
    determining a second grade of the vehicle at the first location.

11. The method of claim 10, wherein the steps of determining a first grade of the vehicle at the first location and determining a second grade of the vehicle at the first location are performed by a transmission control circuit of the transmission.

12. The method of claim 10, wherein the determining one or more auxiliary pump speeds of an auxiliary pump of the transmission for an engine stop-start event based on the determined one or more grades of the vehicle at the first location comprises:
    determining a first auxiliary pump speed for an engine stop-start event based on the determined first grade of the vehicle at the first location; and determining a second auxiliary pump speed for the engine stop-start event based on the determined second grade of the vehicle at the first location.

13. The method of claim 12, wherein a grade settling error is added to the determined first grade of the vehicle before determining the first auxiliary pump speed.

14. The method of claim 9, further comprising the steps of:
while the vehicle is at the first location, holding a gear and selective coupler arrangement in a first configuration with the auxiliary pump of the transmission; and
subsequently, while the vehicle is traveling, configuring the gear and selective coupler arrangement with a main pump of the transmission.

15. A method of controlling a transmission during an engine stop-start event of an engine of a powertrain of a vehicle, the method comprising:
determining one or more grades of the vehicle at a first location;
adding a grade settling error to the determined one or more grades of the vehicle;
determining one or more auxiliary pump speeds of an auxiliary pump of the transmission for an engine stop-start event based on the determined one or more grades of the vehicle at the first location;
while the vehicle is at the first location, holding a gear and selective coupler arrangement in a first configuration with the auxiliary pump of the transmission; and
subsequently, while the vehicle is traveling, configuring the gear and selective coupler arrangement with a main pump of the transmission.

16. The method of claim 15, wherein the determining one or more grades of the vehicle at a first location comprises:
determining a first grade of the vehicle at the first location; and
determining a second grade of the vehicle at the first location.

17. The method of claim 16, wherein the steps of determining a first grade of the vehicle at the first location and determining a second grade of the vehicle at the first location are performed by a transmission control circuit of the transmission.

18. The method of claim 15, wherein the determining one or more auxiliary pump speeds of an auxiliary pump of the transmission for an engine stop-start event based on the determined one or more grades of the vehicle at the first location comprises:
determining a first auxiliary pump speed for an engine stop-start event based on the determined first grade of the vehicle at the first location; and
determining a second auxiliary pump speed for the engine stop-start event based on the determined second grade of the vehicle at the first location.

19. The method of claim 15, further comprising the steps of:
determining one of the one or more determined auxiliary pump speeds exceed a threshold allowable speed; and
based on the one of the one or more determined auxiliary pump speeds exceeding the threshold allowable speed, communicating an engine stop-start deny communication to an engine stop-start arbitration controller of the vehicle.

* * * * *